United States Patent [19]

Saikkonen et al.

[11] Patent Number: 5,082,638
[45] Date of Patent: Jan. 21, 1992

[54] PROCESS OF RECOVERING NON-FERROUS METAL VALUES, ESPECIALLY NICKEL, COBALT, COPPER AND ZINC, BY USING MELT AND MELT COATING SULPHATION, FROM RAW MATERIALS CONTAINING SAID METALS

[76] Inventors: Pekka J. Saikkonen, Alakartanontie 4 B 63, SF-02360 Espoo; Jussi K. Rastas, Bredantie 8 D 19, SF-02700 Kauniainen, both of Finland

[21] Appl. No.: 576,478

[22] Filed: Nov. 30, 1990

[30] Foreign Application Priority Data

Mar. 31, 1988 [FI] Finland .................. 881531

[51] Int. Cl.[5] .......................... C01G 49/14
[52] U.S. Cl. .................. 423/145; 423/166; 423/50; 423/106; 423/127; 423/140; 423/146
[58] Field of Search .......... 423/145, 146, 166, 99, 423/106, 123, 127, 158, 49, 50, 101, 140; 75/374

[56] References Cited

U.S. PATENT DOCUMENTS

| | | | |
|---|---|---|---|
| 2,898,197 | 8/1959 | Forward | 423/146 |
| 2,971,835 | 2/1961 | Matson | 423/146 |
| 4,042,474 | 8/1977 | Saarinen | 423/146 |
| 4,193,970 | 3/1980 | Sefton et al. | 423/146 |
| 4,305,914 | 12/1981 | Pammenter et al. | 423/146 |
| 4,464,344 | 8/1984 | Saikkonen | 423/105 |
| 4,707,349 | 11/1987 | Hjersted | 423/146 |

FOREIGN PATENT DOCUMENTS 65088 11/1983 Finland .

*Primary Examiner*—Theodore Morris
*Assistant Examiner*—Edward Squillomte
*Attorney, Agent, or Firm*—Fitch, Even, Tabin & Flannery

[57] ABSTRACT

The invention relates to a process for recovering non-ferrous metal values such as nickel, cobalt, copper, zinc, manganese and magnesium from material containing said metals, by converting the non-ferrous metal values into sulphates by using melt and melt coating sulphation and recovering them as metal compounds by a process entity based on a melt and melt coating sulphation.

9 Claims, 1 Drawing Sheet

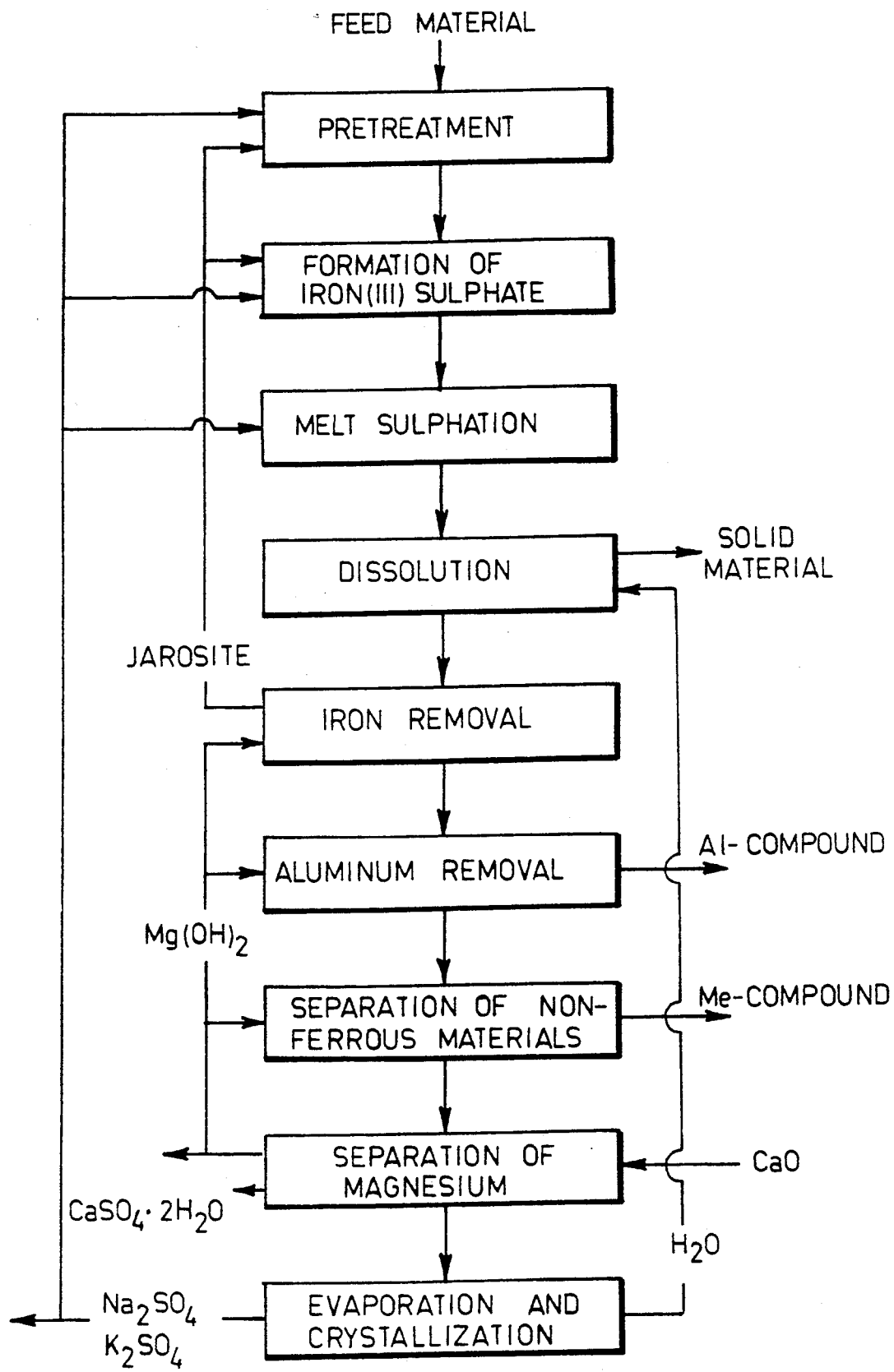

PROCESS OF RECOVERING NON-FERROUS METAL VALUES, ESPECIALLY NICKEL, COBALT, COPPER AND ZINC, BY USING MELT AND MELT COATING SULPHATION, FROM RAW MATERIALS CONTAINING SAID METALS

The invention relates to a process of recovering non-ferrous metal values, especially nickel, cobalt, copper and zinc, from raw materials containing these metals. The essential part of the invention is a process entity formed around the melt and melt coating sulphatizing of an oxidic (or silicated) material or a material subjected to an oxidizing treatment, which process entity makes it possible to recover said metals in an advantageous and simple way.

Finnish Patent 65088 (corresponding to U.S. Pat. No. 4,464,344) discloses a process which is here called melt and melt coating sulphation. The term melt coating sulphation describes a process in which a sulphating reagent forms a coating or a film around the sulphatizing particles in the melt phase while the mixture, containing melt and solid phase, behaves mechanically like a pulverized or paste-like material, depending on the quantity of the melt. In contrast, melt sulphation describes a process where the material is essentially in flux form containing a varying quantity of solid phase. As to the chemical reactions occurring in the system, these definitions are not of importance. The melt and melt coating sulphation disclosed in Finnish Patent 65088 concerns a process of recovering non-ferrous metals from their minerals, mineral concentrates, roasted oxidic intermediates or slags by converting them to sulphates by using as a sulphatizing agent essentially a mixture of solid material and sulphate melt, containing an alkali metal sulphate, iron(III) sulphate and the sulphate(s) of the non-ferrous metal(s) to be obtained In the disclosed process, the reagent to be used in the sulphation mainly consists of the iron(III)sulphate contained in the reaction mixture, and the process is performed within a temperature range where this reagent, $Fe_2(SO_4)_3$, remains essentially stable in the sulphate melt. When applying melt or melt coating sulphation, the main object is usually the sulphation of the oxides of the processed oxidic material or the material subjected to an oxidizing treatment. These oxides are usually ferrites of the formula $MeFe_2O_4$ (Me is Ni, Co, Cu, Zn, ...), and they are sulphated by using the ferrisulphate of the sulphate melt, $Fe_2(SO_4)_3$, according to the reaction disclosed in the main claim of Finnish Patent 65088, i.e. according to the following reaction (1) $3MeFe_2O_4(solid) + Fe_2(SO_4)_3(melt) \rightleftharpoons 3MeSO_4(melt) + Fe_2O_3(solid)$ The mechanism and the kinetics of the reaction between usable Me ferrites and the sulphate melt are described in the article "The Role of Sulfate Melts in Sulfating Roasting, 25th Annual Conference of Metallurgists, Proceedings Nickel Metallurgy, Ed. E. Ozberk and S. W. Marcuson, Series 25-7/6/1/3, No. 3, (Vol. 1)(1986) 278-290" by P. J. Saikkonen and J. K. Rastas.

The thorough-sulphation of the ferrite granules $MeFe_2O_4$ occurs as a reverse diffusion, the $Me^{2+}$-ion moving through a hematite ($Fe_2O_3$) phase which is formed and grows between the ferrite and the sulphate melt phases to the sulphate melt, and the $Fe^{3+}$-ion moving from the sulphate melt through the hematite 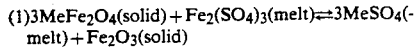 ($Fe_2O_3$) phase in the opposite direction; the entire event can be presented generally by the reaction (2)

(2) $3Me^{2+}(ferrite) + 2Fe^{3+}(melt) \rightleftharpoons 3Me^{2+}(melt) + 2Fe^{3+}(hematite)$.

The thorough-sulphation of ferrite granules is a relatively fast process. The thorough-sulphation of ferrite granules having a diameter of a few tens of micrometers can be carried out at a temperature of 700° C. in about 10 to 20 minutes by melt sulphation.

It should be emphasized that the realization of the melt or melt coating sulphation as a reaction between the solid and the melt phase does not require a gaseous phase as a component participating in the reaction (in contrast to the conventional sulphating roasting), but the gas atmosphere prevailing in the melt and melt sulphation reactor, having an adjustable $SO_3$ content and the amount of which is small in comparison with the solid and the melt phases, only serves the stabilization of the sulphate melt, i.e. prevents the thermal decomposition of sulphate.

When performing sulphating by melt or melt coating sulphation, i.e. by the process disclosed in Finnish Patent 65088, it is important that the amount of iron(III)-sulphate present in the reaction mixture is sufficient to cause a complete conversion of the desired ferrite(s) according to the reaction (1) (or (2)). In this sense, the iron(III)sulphate present in the reaction mixture should not be allowed to decompose, not at least before all the metal value (Me) is in sulphated form. Its amount in the reaction mixture should be optimized by selecting the temperature and the $SO_3$ pressure of the surrounding gas atmosphere controlledly in a known manner so that there is always enough iron(III)sulphate available according to the reaction (1) (or (2)) in the sulphate melt.

Finnish Patent 65088 discusses the prior art relating to conventional sulphatizing roasting. This discussion corresponds well with the present situation. Conventional sulphatizing roasting has disadvantages which, in practice, have prevented its application on a larger scale than at present. In particular, it is known that the sulphation of nickel compounds is not easy to perform, because the particularly compact sulphate shell that is formed on the surface of the granules in the sulphation through a gas phase prevents efficiently the advancing of the sulphation. For this reason, sulphatizing roasting is not commonly used in the processing of nickel raw materials. It was not until the introduction of the melt or melt coating sulphation disclosed in Finnish Patent 65088 that brought about an improvement in this respect.

For the sulphation of typical nickel raw materials it is, however, usually necessary that the reaction mixture contains a considerable amount of sulphate melt. This requires the use of rather large quantities of alkali metal and iron(III)sulphate, which causes considerable processing costs. A solution has now been found that enables, if necessary, the use of rather large amounts of sulphate melt at the melt and melt coating phase, while it reduces the considerable processing costs caused by the use of large quantities of alkali metal and iron(III)-sulphate.

The invention relates to a process entity formed around the melt and melt coating sulphation. The new process of the invention makes it possible to recover valuable metals in an advantageous and simple way.

The process is shown schematically in FIG. 1. Preferably, the process comprises the following steps:

1. A pretreatment step to convert the material to be sulphatized into an oxidic and ferritic form easy to treat in the melt or melt coating sulphation.

2. Efficient formation of iron(III)sulphate in the reaction mixture by selecting the roasting conditions in this respect, and recycling or addition of the iron(III)sulphate.

3. Establishing and maintaining of melting conditions favourable to the sulphation in order to carry out the sulphation as completely as possible (the melt and melt coating sulphation), and a thermal after-treatment connected thereto, if necessary, as disclosed in Finnish Patent 65088, in which treatment the iron(III)sulphate of the sulphate melt is decomposed into hematite ($Fe_2O_3$) in order to decrease the amount of water soluble iron and to reduce the costs of the precipitation of iron (step 5).

4 Dissolution step—where the sulphate melt is dissolved in water—and the separation of the solid material and the solution and the purification of the solid material also connected to this step.

5. Removal of iron: the precipitation of iron as jarosite, and the recycling of the jarosite to steps 1 and/or 2.

6. Removal of aluminum (if aluminum is included in the feed): the aluminum is precipitated as hydroxide or alunite.

7. Separation of metal values (Me): fractionation or co-hydroxide- or sulphide precipitation, ion exchange or liquid-liquid-extraction.

8. Separation of magnesium: magnesium is precipitated as hydroxide by using lime as a neutralizer. The step also comprises the separation of the magnesium hydroxide and the gypsum formed.

9. Separation of alkali metal sulphates: the concentration of the solution and the separation of the salts is performed by, e.g., evaporation crystallization, whereby the alkali metal sulphate is recycled to steps 1 to 3 and the excessive alkali metal sulphate (if the feed contains alkali metal compounds) is removed from the circulation. Condensed water is recycled to step 4. FIG. 1 shows the process steps when the Me separation is carried out by hydroxide precipitation.

The steps 1, 2 and 3 are not necessarily distinct. Thus, the steps can be combined by circulating coarse unroasted material and directing circulating dusts after suitable cooling to the formation of the sulphatizing mixture, whereby the recycling alkali metal sulphate is added to steps 1 to 3 in suitable proportions so that no operational disturbances occur due to excessive formation of melt.

The invention is described in greater detail in the following examples.

EXAMPLE 1

A sulphidic nickel concentrate having a nickel, copper and cobalt content of 8.2%, 3.8% and 0.21%, respectively, was pretreated by roasting. Sodium jarosite ($Na[Fe_3(SO_4)_2(OH)_6]$)—that is decomposed sodium jarosite—and sodium sulphate were fed to the after-treatment step of the roasting. The composition of the mixture was adjusted to be suitable for melt-melt coating sulphation. The melt sulphation was effected at a temperature of 690° C., in 20 minutes. The $SO_2$ content of the shielding gas atmosphere was about 5 %. The results of the analysis were the following:

| Water soluble (%) | | | | |
|---|---|---|---|---|
| Na | Fe | Ni | Cu | Co |
| 5.1 | 7.2 | 4.1 | 1.9 | 0.11 |
| Water insoluble (%) | | | | |
| | Ni | Cu | | Co |
| | 0.081 | 0.012 | | 0.0030 |
| Degree of sulphation (%) | | | | |
| | Ni | Cu | | Co |
| | 98.1 | 99.4 | | 97.3 |

EXAMPLE 2

Sulphidic nickel ore having a nickel, copper and cobalt content of 2.5%, 0.7% and 0.2%, respectively, was pretreated by roasting and after-treated to form iron(III)sulphate. Sodium sulphate was added to the roasted product thus obtained. The mixture was melt sulphated at a temperature of 705° C., for 15 minutes. The $SO_2$ of the shielding gas atmosphere was about 5%. The results of the analysis were the following:

| Water soluble (%) | | | | |
|---|---|---|---|---|
| Na | Fe | Ni | Cu | Co |
| 3.9 | 4.5 | 2.2 | 0.60 | 0.17 |
| Water insoluble (%) | | | | |
| | Ni | Cu | | Co |
| | 0.092 | 0.018 | | 0.0048 |
| Degree of sulphation (%) | | | | |
| | Ni | Cu | | Co |
| | 96.0 | 97.1 | | 97.3 |

EXAMPLE 3

A sulphidic nickel concentrate having a nickel, copper, cobalt and magnesium content of 7.7%, 2.5%, 0.24% and 6.4%, respectively, was pretreated by roasting and after-treated to form iron(III)sulphate. To the after-treatment step, sodium jarosite was fed which decomposed thermally according to the reaction (3):(3)
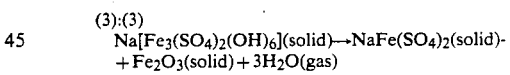
$Na[Fe_3(SO_4)_2(OH)_6](solid) \rightarrow NaFe(SO_4)_2(solid) + Fe_2O_3(solid) + 3H_2O(gas)$ Sodium sulphate was added to the roasted product obtained. The mixture was melt sulphated at a temperature of 705° C. for 20 minutes. The $SO_2$ content of the shielding gas atmosphere was about 5%. Results of analysis:

| Water soluble (%) | | | | | |
|---|---|---|---|---|---|
| Na | Fe | Ni | Cu | Co | Mg |
| 6.4 | 8.2 | 2.6 | 0.85 | 0.082 | 2.2 |
| Water insoluble (%) | | | | | |
| | Ni | Cu | Co | | Mg |
| | 0.074 | 0.016 | 0.0020 | | 0.028 |
| Degree of sulphation (%) | | | | | |
| | Ni | Cu | Co | | Mg |
| | 97.2 | 98.2 | 97.6 | | 98.7 |

EXAMPLE 4

A sulphidic nickel concentrate having a nickel, copper, cobalt and magnesium content of 5.1%, 1.5%, 0.21% and 1.2%, respectively, was pretreated by roasting and after-treated to form iron(III)sulphate. Sodium jarosite was fed to the after-treatment step whereby it decomposed thermally according to the reaction (3). Sodium sulphate was added to the roasted product so obtained. The mixture was melt sulphated at a temperature of 750° C. for 10 minutes. The $SO_2$ content of the shielding gas atmosphere was 20%. The mixture was after-treated thermally. Results of analysis:

| Water soluble (%) | | | | | |
|---|---|---|---|---|---|
| Na | Fe | Ni | Cu | Co | Mg |
| 6.1 | 2.7 | 3.5 | 1.0 | 0.14 | 0.82 |
| Water insoluble (%) | | | | | |
| Ni | | Cu | | Co | Mg |
| 0.075 | | 0.016 | | 0.004 | 0.010 |
| Degree of sulphation (%) | | | | | |
| Ni | | Cu | | Co | Mg |
| 97.9 | | 98.4 | | 97.2 | 98.8 |

EXAMPLE 5

The material of the preceding example was treated in the same way as in the preceding example, but the composition of the melt was adjusted to have a higher content of sodium and a lower content of iron(III). No thermal after-treatment was performed. Conditions of melt sulphation were temperature 775° C., duration 10 minutes, $SO_2$ content of shielding gas atmosphere 20%. Results of analysis:

| Water soluble (%) | | | | | |
|---|---|---|---|---|---|
| Na | Fe | Ni | Cu | Co | Mg |
| 10.7 | 4.3 | 3.0 | 0.88 | 0.12 | 0.73 |
| Water insoluble (%) | | | | | |
| Ni | | Cu | | Co | Mg |
| 0.087 | | 0.020 | | 0.0024 | 0.05 |
| Degree of sulphation (%) | | | | | |
| Ni | | Cu | | Co | Mg |
| 97.2 | | 97.8 | | 98.0 | 93.6 |

EXAMPLE 6

Finely ground metal scrap having a Co, Ni and Fe content of 11.5%, 9.8% and 24%, respectively, was mixed with the sulphidic concentrate of the preceding example, and the same procedure was followed as in the preceding example. The following results were obtained:

| Water soluble (%) | | | |
|---|---|---|---|
| Na | Fe | Co | Ni |
| 4.4 | 5.3 | 1.90 | 1.25 |
| Water insoluble (%) | | | |
| | Co | | Ni |
| | 0.038 | | 0.050 |
| Degree of sulphation (%) | | | |
| | Co | | Ni |
| | 98.0 | | 96.2 |

EXAMPLE 7

Finely ground silicate-containing slag having a Ni, Co, Cu, Fe and $SiO_2$ content of 11.2%, 3.1%, 4.2%, 38.5% and 18.8%, respectively, was mixed with a roasted product ($Fe_2O_3$) of pyrite and the thermal decomposition product of sodium jarosite (reaction (3)) as well as with sodium sulphate. The mixture was subjected to long-lasting melt sulphation (5 h). Conditions of melt sulphation were temperature 700° C. and $SO_2$ content of shielding gas atmosphere about 5%. Results of analysis:

| Water soluble (%) | | | | |
|---|---|---|---|---|
| Na | Fe | Ni | Co | Cu |
| 6.0 | 5.2 | 2.8 | 0.77 | 1.0 |
| Water insoluble (%) | | | | |
| | Ni | Co | | Cu |
| | 0.13 | 0.034 | | 0.008 |
| Degree of sulphation (%) | | | | |
| | Ni | Co | | Cu |
| | 95.6 | 95.8 | | 99.2 |

EXAMPLE 8

The slag of the preceding example was pretreated with concentrated sulphuric acid to decompose the silicate-containing phase. A sulphidic concentrate containing a small amount of cobalt and nickel (about 1 %) was pretreated by roasting and after-treated to form iron(III)sulphate, to which phase the pretreated silicate-containing slag and sodium jarosite were fed. The sodium sulphate was also fed to this phase. The mixture so obtained was melt sulphated. Conditions of melt sulphation were temperature 720° C., duration 20 minutes, and $SO_2$ content of shielding gas atmosphere 12%. A moderate thermal after-treatment was performed. Results of analysis:

| Water soluble (%) | | | | |
|---|---|---|---|---|
| Na | Fe | Ni | Co | Cu |
| 7.4 | 3.1 | 3.3 | 1.0 | 1.2 |
| Water insoluble (%) | | | | |
| | Ni | Co | | Cu |
| | 0.08 | 0.021 | | 0.012 |
| Degree of sulphation (%) | | | | |
| | Ni | Co | | Cu |
| | 97.6 | 97.9 | | 99.0 |

EXAMPLE 9

Finely ground silicate-containing slag having a Co, Cu, Fe and $SiO_2$ content of 1.2%, 4,5%, 40% and 25%, respectively, was mixed with a roasted product ($Fe_2O_3$) of pyrrhotite and the thermal decomposition product of sodium jarosite as well as with sodium sulphate. The mixture was subjected to melt sulphation. Conditions of melt sulphation were temperature 700° C., $SO_2$ content of shielding gas atmosphere 6% and reaction time 4 hours. Results of analysis:

| Water soluble (%) | | | |
|---|---|---|---|
| Na | Fe | Co | Cu |
| 6.1 | 4.9 | 0.53 | 2.1 |
| Water insoluble (%) | | | |
| | Co | | Cu |
| | 0.025 | | 0.018 |
| Degree of sulphation (%) | | | |

| Co | Cu |
|---|---|
| 95.5 | 99.2 |

EXAMPLE 10

A graphite-containing sulphidic concentrate low in non-ferrous metal content and having the following analysis (%):

| Fe | S | C | Ni | Co | Cu | Zn | K | Al | Mg | Mn |
|---|---|---|---|---|---|---|---|---|---|---|
| 25.5 | 21.7 | 17.5 | 0.69 | 0.056 | 0.35 | 1.2 | 1.6 | 2.9 | 0.79 | 0.15 | was pretreated by roasting and further treated to form iron(III)sulphate, to which step the sodium sulphate was fed, too. The mixture was melt sulphated. Conditions of melt sulphation were temperature 685° C., duration 30 minutes, and $SO_2$ content of shielding gas atmosphere about 5%. A moderate thermal after-treatment was performed. Results of analysis:

| Water soluble (%) | | | | | | | | | |
|---|---|---|---|---|---|---|---|---|---|
| Na | Fe | Ni | Co | Cu | Zn | K | Al | Mg | Mn |
| 3.0 | 1.0 | 0.58 | 0.041 | 0.30 | 1.1 | 1.1 | 1.8 | 0.61 | 0.14 |
| Water insoluble (%) | | | | | | | | | |
| Ni | Co | Cu | Zn | K | Al | Mg | Mn | | |
| 0.038 | 0.0036 | 0.014 | 0.014 | 0.45 | 1.2 | 0.06 | 0.004 | | |
| Degree of sulphation (%) | | | | | | | | | |
| Ni | Co | Cu | Zn | K | Al | Mg | Mn | | |
| 93.9 | 91.9 | 95.5 | 98.7 | 71 | 60 | 91 | 97 | | |

EXAMPLE 11

To a limonitic concentrate having a Ni content of which was about 2.5%, thermally decomposed sodium jarosite and sodium sulphate were added and the mixture was stirred. The mixture was subjected to melt sulphation and thermal after-treatment. Conditions of melt sulphation were temperature 720° C., duration 2 hours, and $SO_2$ content of shielding gas atmosphere 7%. Results of analysis:

| Water soluble (%) | | | | |
|---|---|---|---|---|
| Na | Fe | Ni | Co | Mg |
| 7.0 | 2.2 | 1.2 | 0.06 | 3.5 |
| Water insoluble (%) | | | | |
| Ni | Co | Mg | | |
| 0.057 | 0.0018 | 0.22 | | |

| Degree of sulphation (%) | | |
|---|---|---|
| Ni | Co | Mg |
| 95.5 | 97.1 | 94.1 |

In all the given examples, the dissolution of the melt or melt coating sulphated product is performed by a known counterflow dissolution thickening (or filtering) method. In the dissolution step, the sulphate melt dissolves in water; the insoluble solid material and the solution phase are separated and the solid phase is washed. The water is fed to the washing step of the solid material to be separated and the solution is taken out from the process at the first separation step of the dissolution (thickening or filtering). In the dissolution, the solution/solid material ratio may suitably vary between 0.5 and 2.

In Examples 1 to 11 the following compositions are obtained for the solutions to be separated:

| Ex. | Solution/ solid material | Na | Fe | Ni | Cu | Co | Zn | Mg | K | Al | Mn |
|---|---|---|---|---|---|---|---|---|---|---|---|
| 1 | 2 g/l | 25 | 35 | 20 | 9.5 | 0.55 | | | | | |
| 2 | 1 g/l | 39 | 44 | 22 | 5.9 | 1.6 | | | | | |
| 3 | 2 g/l | 32 | 40 | 13 | 4.2 | 0.40 | | 10 | | | |
| 4 | 2 g/l | 30 | 13 | 17 | 5 | 0.70 | | 4.0 | | | |
| 5 | 2 g/l | 53 | 21 | 15 | 4.3 | 0.58 | | 3.6 | | | |
| 6 | 1.5 g/l | 29 | 35 | 8.2 | | | 12.5 | | | | |
| 7 | 2 g/l | 30 | 26 | 14 | 5.0 | 3.8 | | | | | |
| 8 | 1.5 g/l | 49 | 20 | 22 | 8 | 6.6 | | | | | |
| 9 | 1 g/l | 60 | 48 | | 20 | 5.2 | | | | | |
| 10 | 0.5 g/l | 60 | 20 | 11.6 | 6.0 | 0.82 | 22 | 12.2 | 22 | 36 | 2.8 |
| 11 | 1.5 g/l | 47 | 15 | 8.0 | | 0.40 | | 23 | | | |

Iron(III) is precipitated from the solution as an alkali metal(Na,K)jarosite according to the reaction (4)

(4)
$3Fe_2(SO_4)_3(aq)+Na_2SO_4(aq)+6Mg(OH)_2$(solid)$\rightarrow 2Na[Fe_3(SO_4)_2(OH)_6]$(solid)$+6MgSO_4$(aq)

by using magnesium hydroxide as a neutralizer. Lime or limestone can also be used as a neutralizer, whereby an equivalent quantity of gypsum is formed in addition to jarosite; the gypsum is separated mechanically from jarosite, washed and removed from the system. In all cases the jarosite is recycled to the steps 1 and/or 2.

When magnesium hydroxide was used as a neutralizer, the compositions of the solutions after the iron separation step are the following:

| Ex. | | Na | Fe | Ni | Cu | Co | Zn | Mg | K | Al | Mn |
|---|---|---|---|---|---|---|---|---|---|---|---|
| 1 | g/l | 21 | 0.2 | 19.5 | 9.2 | 0.54 | | 15 | | | |
| 2 | g/l | 34 | 0.3 | 21.2 | 5.4 | 1.5 | | 18 | | | |
| 3 | g/l | 28 | 0.3 | 12.6 | 4.1 | 0.38 | | 27 | | | |
| 4 | g/l | 28 | 0.2 | 16.5 | 4.7 | 0.67 | | 10 | | | |
| 5 | g/l | 50 | 0.3 | 14.6 | 4.2 | 0.56 | | 13 | | | |
| 6 | g/l | 24 | 0.3 | 8.1 | | | 12.2 | 15 | | | |
| 7 | g/l | 27 | 0.3 | 13.4 | 4.8 | 3.6 | | 11 | | | |
| 8 | g/l | 47 | 0.3 | 21.4 | 7.6 | 6.4 | | 9 | | | |
| 9 | g/l | 54 | 0.2 | | 19.4 | 5.1 | | 20 | | | |
| 10 | g/l | 58 | 0.2 | 11.2 | 5.6 | 0.80 | 21.4 | 20 | 18 | 32 | 2.6 |
| 11 | g/l | 45 | 0.2 | 7.7 | | 0.39 | | 30 | | | |

After the iron separation step, a combined precipitation of the metals (Me) was performed in all the other examples except Example 10 by using magnesium hydroxide as a neutralizer. The Me hydroxides are removed from the process, and they can be treated by known methods to obtain pure Me compounds. In Example 10, aluminium was separated first by precipitating it as hydroxide and by converting the aluminium hydroxide in a single treatment step to alunite, in which form the aluminium was removed from the process. After said treatment step, the solution was recycled to the process. In Example 10, the combined precipitation of the metal values was performed thereafter.

After the separation of the metal values, magnesium was removed from the solutions by precipitating it as hydroxide using lime as a neutralizer. The gypsum formed in the reaction was separated mainly mechanically; it was washed and removed from the process. Then the magnesium hydroxide and the remaining gypsum were separated from the solution phase. Magnesium hydroxide was used as a neutralizer in steps 5, 6 and 7. The alkali metal sulphates were separated from the solutions by evaporation crystallization. The alkali metal sulphate was recycled to process steps 1, 2 and/or 3. Condensed water was recycled to the dissolution step.

We claim:

1. A process of recovering non-ferrous metal values, especially nickel, cobalt, zinc, manganese and magnesium from raw materials containing said metals, by converting the non-ferrous metal values into sulphates by melt and melt coating sulphation and recovering non-ferrous metal compounds comprising:

(a) when necessary, pretreating the raw material to convert the metals therein into oxidic and ferritic forms;

(b) forming a reaction mixture containing the pretreated raw materials and sufficient amounts of iron(III)sulphate and alkali metal sulphates to permit complete sulphation;

(c) melt sulphatizing and melt coating sulphatizing the reaction mixture to cause formation of metal sulphates;

(d) dissolving the metal sulphates in water to form a solution and separating the undissolved solid material from the solution;

(e) precipitating iron(III) from the solution as alkali metal jarosite and recycling the alkali metal jarosite to the formation step described in paragraph (b);

(f) separating the non-ferrous metals from the solution by fractionation or combined hydroxide or sulphide precipitation, ion exchange or liquid-liquid extraction;

(g) precipitating magnesium from the solution by the addition of lime thereby forming calcium hydroxide and gypsum, separating the gypsum from the solution, separating the magnesium hydroxide from the solution, recycling magnesium hydroxide to either of the steps described in paragraphs (e) and (f) and removing any excess magnesium hydroxide from the process; and (h) separating the alkali metal sulphates from the solution by evaporation crystallization, recycling the alkali metal sulphates to any of the steps described in paragraphs (a), (b) and (c), and removing any excess alkali metal sulphates from the process.

2. The process of claim 1 characterized in that when the raw material contains aluminum, the aluminum is separated from the solution by precipitating as hydroxide or alunite immediately after the iron removal step.

3. The process of claim 1, characterized in that when the raw material contains a sulphidic or metallic phase, the pretreatment includes roasting in the presence of oxygen.

4. The process of claim 1, characterized in that the raw material is silicate slag and the pretreatment step is a decomposing treatment of the structure of the silicatic phase with concentrated sulphuric acid at a temperature ranging from 200° C. to 300° C., the time of treatment being between 5 minutes and 1 hour.

5. The process of claim 1 characterized in that the iron(III) sulphate forming step is an oxidizing thermal treatment of the material containing iron in an atmosphere containing sufficient amounts of $SO_2$ and $SO_3$ such that the compound $Fe_2(SO_4)_3$(solid) is stable.

6. The process of claim 1 characterized in that the reaction mixture has a molar ratio of the iron(III) sulphate of at least 0.1, preferably about 0.5, and the total amount of the iron(III) sulphate in the mixture is at least the amount needed to react with the metal (Me) according to the reaction: $3MeO(solid) + Fe_2(SO_4)_3(melt) \rightarrow 3MeSO_4(melt) + Fe_2O_3(solid)$ and the reaction conditions are selected so that the thermal decomposition of the iron(III)sulphate in the melt according to the reaction $Fe_2(SO_4)_3(melt) \rightarrow Fe_2O_3(solid) + 3SO_3(gas)$ is essentially prevented.

7. The process of claim 1 characterized in that the melt and melt coating sulphation is performed at a temperature between 600° and 800° C. in an equilibrium gas atmosphere the $SO_3$ content of which is controlled so that the iron(III)sulphate in the reaction mixture does not essentially decompose thermally.

8. The process of claim 1 characterized in that after the sulphation reaction the amount of the iron(III)sulphate remaining in the reaction mixture is decreased in order to decrease the amount of water-soluble iron by converting the iron sulphate to hematite by decreasing the $SO_3$-content of the gas atmosphere and/or by increasing the temperature in one portion of the melt and melt coating sulphation reactor or by performing such steps in a separate reactor.

9. The process of claim 3, characterized in that the iron(III)sulphate forming step is an oxidizing thermal treatment of the material containing iron in an atmosphere containing sufficient amounts of $SO_2$ and $SO_3$ such that the compound $Fe_2(SO_4)_3$(solid) is stable.

* * * * *

UNITED STATES PATENT AND TRADEMARK OFFICE
CERTIFICATE OF CORRECTION

PATENT NO. : 5,082,638
DATED : January 21, 1992
INVENTOR(S) : Pekka J. SAIKKONEN et al.

It is certified that error appears in the above-identified patent and that said Letters Patent is hereby corrected as shown below:

In the Assistant Examiner's name, change "Squillomte" to --Squillante--.

Column 1, line 36, change "iron(III) sulphate" to --iron(III)sulphate--.

Column 1, line 37, after "obtained" insert a period.

Column 3, line 66, change "$SO_O$content" to --$SO_2$ content--.

Column 4, line 21, after "$SO_2$" insert --content--.

Column 4, line 42, after "reaction" insert --(3):--.

Column 4, line 44, change "(3):(3)" to --(3)--.

Column 10, line 8, after "1" insert a comma.

Column 10, line 23, change "iron(III) sulphate" to --iron(III)sulphate--.

Column 10, line 27, after "1" insert a comma.

Column 10, lines 29-30, change "iron(III) sulphate" to --iron(III)sulphate--.

UNITED STATES PATENT AND TRADEMARK OFFICE
CERTIFICATE OF CORRECTION

PATENT NO. : 5,082,638
DATED : January 21, 1992
INVENTOR(S) : Pekka J. SAIKKONEN et al.

It is certified that error appears in the above-identified patent and that said Letters Patent is hereby corrected as shown below:

```
Column 10, line 30, change "iron(III) sulphate" to
     --iron(III)sulphate--.

Column 10, line 32, change "(solid" to --(solid)--.

Column 10, line 38, after "1" insert a comma.

Column 10, line 44, after "1" insert a comma.

Column 10, line 48, change "iron sulphate" to
     --iron(III)sulphate--.
```

Signed and Sealed this

Thirteenth Day of April, 1993

Attest:

STEPHEN G. KUNIN

Attesting Officer     Acting Commissioner of Patents and Trademarks